(12) United States Patent  
Guild

(10) Patent No.: US 12,082,276 B1
(45) Date of Patent: Sep. 3, 2024

(54) AUTOMATIC PAIRING OF PERSONAL DEVICES WITH PERIPHERAL DEVICES

(71) Applicant: Apple Inc., Cupertino, CA (US)

(72) Inventor: Benjamin Guild, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 464 days.

(21) Appl. No.: 17/411,958

(22) Filed: Aug. 25, 2021

Related U.S. Application Data

(60) Provisional application No. 63/070,512, filed on Aug. 26, 2020.

(51) Int. Cl.
H04W 4/00 (2018.01)
H04L 9/30 (2006.01)
H04L 9/32 (2006.01)
H04M 1/72412 (2021.01)
H04M 1/72454 (2021.01)
H04W 4/80 (2018.01)
H04W 76/14 (2018.01)

(52) U.S. Cl.
CPC ............. H04W 76/14 (2018.02); H04L 9/30 (2013.01); H04L 9/3247 (2013.01); H04M 1/72412 (2021.01); H04M 1/72454 (2021.01); H04W 4/80 (2018.02)

(58) Field of Classification Search
CPC ... H04W 76/14; H04W 4/80; H04M 1/72412; H04M 1/72454; H04L 9/30; H04L 9/3247
USPC ........................................................ 370/329
See application file for complete search history.

(56) References Cited

U.S. PATENT DOCUMENTS

| 9,271,662 | B2* | 3/2016 | Stemmer | G01R 33/5676 |
| 9,769,858 | B2 | 9/2017 | Seymour et al. | |
| 9,942,223 | B2 | 4/2018 | Vincent et al. | |
| 9,973,883 | B2 | 5/2018 | Baker et al. | |
| 10,166,123 | B2 | 1/2019 | Dow et al. | |
| 10,200,466 | B2* | 2/2019 | Desai | H04L 67/104 |
| 10,382,203 | B1* | 8/2019 | Loladia | H04L 63/06 |
| 10,448,214 | B1* | 10/2019 | Jarvis | H04W 4/029 |
| 11,457,057 | B2* | 9/2022 | Pathak | H04L 63/0807 |
| 11,523,243 | B2* | 12/2022 | Satongar | H04N 7/152 |
| 11,601,546 | B2* | 3/2023 | Palin | H04W 8/005 |
| 11,843,916 | B2* | 12/2023 | Wexler | H04R 25/65 |
| 2012/0003933 | A1* | 1/2012 | Baker | H04W 74/02 455/41.2 |
| 2015/0050888 | A1* | 2/2015 | Baker | H04W 74/02 455/41.2 |
| 2015/0282216 | A1* | 10/2015 | Reshef | H04L 63/104 455/39 |

(Continued)

Primary Examiner — Marceau Milord
(74) Attorney, Agent, or Firm — Brownatein Hyatt Farber & Schreck, LLP

(57) ABSTRACT

Embodiments include devices and methods for using a personal device to interact with a peripheral device. Methods can include receiving a pairing message, generated by the peripheral device, in response to a user interaction with the peripheral device, and detecting, at the personal device, a user gesture that is associated with use of the peripheral device. The methods can also include establishing a dedicated wireless connection with the peripheral device in response to detecting the user gesture, receiving a real-time data stream over the wireless connection, and outputting information at least partially based on data received from the peripheral device via the real-time data stream to the user.

20 Claims, 5 Drawing Sheets

(56) References Cited

U.S. PATENT DOCUMENTS

| | | | | |
|---|---|---|---|---|
| 2015/0351142 A1* | 12/2015 | Seymour | H04R 25/554 | 455/41.3 |
| 2015/0351143 A1* | 12/2015 | Seymour | H04R 25/554 | 455/41.2 |
| 2016/0062721 A1* | 3/2016 | Marcos | G06F 3/1423 | 345/2.3 |
| 2016/0063847 A1* | 3/2016 | Hawkins | G08B 21/0277 | 340/539.11 |
| 2016/0065714 A1* | 3/2016 | Marcos | H04M 1/72406 | 455/556.1 |
| 2016/0065715 A1* | 3/2016 | Marcos | H04M 19/04 | 455/414.1 |
| 2016/0242022 A1* | 8/2016 | Jung | H04W 76/14 | |
| 2016/0294973 A1* | 10/2016 | Bakshi | G06F 3/048 | |
| 2016/0296116 A1* | 10/2016 | Baker | A61B 5/0024 | |
| 2016/0360503 A1* | 12/2016 | Boesen | A61B 5/6817 | |
| 2017/0035296 A1* | 2/2017 | Baker | H04W 4/70 | |
| 2017/0149771 A1* | 5/2017 | Vincent | H04W 76/14 | |
| 2017/0223490 A1* | 8/2017 | Baker | A61B 5/002 | |
| 2018/0121623 A1* | 5/2018 | Boesen | A61B 5/6817 | |
| 2018/0255174 A1* | 9/2018 | Rauenbuehler | H04W 84/18 | |
| 2019/0183430 A1* | 6/2019 | Alphonse | A61B 5/1118 | |
| 2020/0169633 A1* | 5/2020 | Palin | H04M 1/6066 | |
| 2021/0160624 A1* | 5/2021 | Wexler | H04R 25/606 | |
| 2021/0366606 A1* | 11/2021 | Shahadi | G01S 13/89 | |
| 2023/0031087 A1* | 2/2023 | Tussy | H04W 12/06 | |

\* cited by examiner

AUTOMATIC PAIRING OF PERSONAL DEVICES WITH PERIPHERAL DEVICES

CROSS-REFERENCE TO RELATED APPLICATION

This application is a nonprovisional of, and claims the benefit under 35 U.S.C. § 119(e) of, U.S. Provisional Patent Application No. 63/070,512, filed Aug. 26, 2020, the contents of which are incorporated herein by reference as if fully disclosed herein.

FIELD

The described embodiments relate generally to devices, methods, and systems for using a personal device to interact with a peripheral device. More particularly, the present embodiments relate to automatically pairing and interacting with a peripheral device using a wearable device.

BACKGROUND

A person may interact with a variety of different peripheral devices that output information to a user including devices such as scales, heart rate monitors, and blood pressure detectors that are used to measure a physiological parameter of a user; home appliances such as thermostats, entertainment systems, lighting systems, cooking equipment; and/or other electronic sensors. Typically each one of these devices has a control interface and a display for presenting information to a user. For example, a scale may have a display that shows a user his or her weight. Further, a user wishing to interact with a device may need to learn each device's integrated controls to select a feature or change a function associated with a device.

In some cases, a separate device such as a smartphone may be paired with and used to control a peripheral device. However, typical pairing methods involve multiple steps that typically require a user to manually enter one or more inputs to confirm the pairing and/or disconnect his or her device from the peripheral device. Such communications generally do not allow for seamless pairing of the user's device (e.g., smartphone) with the peripheral device. As more smart products become available and commonplace, users may desire additional ways to interact with these devices.

SUMMARY

A first set of embodiments is directed to a method for using a personal device to interact with a peripheral device. The method can include receiving a pairing message, generated by the peripheral device, in response to a user interaction with the peripheral device, and detecting a user gesture that is associated with use of the peripheral device at the personal device. The method can also include establishing a dedicated wireless connection with the peripheral device in response to receiving the pairing message and detecting the user gesture, receiving a real-time data stream over the dedicated wireless connection, and outputting, information to a user at least partially based on data received from the peripheral device via the real-time data stream.

Another set of embodiments is directed to a method for operating a peripheral device. The method can include sending a pairing message from the peripheral device in response to a user interaction with the peripheral device, and receiving a connection request from a personal device that includes an indication of a user input that is associated with use of the peripheral device. The method can also include evaluating one or more criteria associated with one or more personal devices within a wireless range of the peripheral device, and in response to evaluating the one or more criteria and the user input, establishing a dedicated wireless connection with a first personal device of the one or more personal devices. The method can further include receiving a command from the first personal device related to the user interaction with the peripheral device, and transmitting a data stream over the dedicated wireless connection to the personal device in response to receiving the command, where the data stream including data relating to the user interaction with the peripheral device.

Another set of embodiments is directed to a method for operating a peripheral device that includes transmitting a pairing message from the peripheral device in response to a user interaction with the peripheral device and receiving a connection request from first and second personal devices. The method can also include determining a signal strength for each of the first and second personal devices, determining a software capability of each of the first and second personal devices, and receiving a signal of a detected user input occurring at one of the at least first or second personal devices. The method can further include establishing a dedicated wireless connection with one of the first or second personal devices at least partially based on comparing the signal strength, the software capability, and the signal of the detected user input in response to receiving the connection request from the first and second personal devices. The method can include transmitting a data stream over the dedicated wireless connection, the data stream including data relating to the user interaction with the peripheral device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
FIG. 1 shows an example system that uses a wearable device to pair with a peripheral device.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments disclosed herein are directed to devices, techniques, and systems for using a personal device to interact with a peripheral device. As used herein, a "personal device" is an electronic device that is worn, carried, or otherwise associated with a single user, and a "peripheral device" is an electronic device that can be used by multiple different users. The system may operate to identify and establish a dedicated wireless connection between a personal device of a user and a peripheral device. In situations where multiple personal devices are located within a wireless range of a peripheral device, it can be difficult to select one of the personal devices to establish a dedicated wireless connection with. For example, the peripheral device may be a health monitor device that includes one or more sensors for measuring a physiological parameter of a user. However, the peripheral device may need to identify the personal device associated with a user of the peripheral device from multiple other personal devices that are associated with other people in the immediate vicinity. If the wrong device is selected, then the user's data, such as sensitive physiological data, may be sent to the wrong device. Further, as peripheral devices become more common, traditional pairing mechanisms such as navigating menus to manually select devices for pairing with becomes cumbersome. Such manual pairing processes may require a user to be frequently navigating menus to initiate pairing with a device and then manually disconnect from that device once the user is done interacting with it.

The embodiments disclosed herein are directed to techniques and systems that facilitate automatic and reliable pairing of a personal device with a peripheral device. For example, the peripheral device can automatically identify and pair with the user's personal device by using one or more criteria to select it from multiple nearby personal devices. In some cases, this can include evaluating one or more criteria associated with each nearby personal device and comparing metrics for each of the personal device to select a personal device that is associated with the user of a peripheral device. For example, a user may initiate an interaction with a peripheral device by approach and/or beginning to interact with the peripheral device such as by activating a user interface, using the device in an intended way, and so on. In response, the peripheral device may transmit a wireless pairing signal that solicits information from all nearby devices. This information can include criteria that indicates a proximity of each personal device to the peripheral device, such as a wireless signal strength; an interaction with the personal device that indicates the user of that personal device is interacting with or intends to interact with the personal device, such as a gesture; and/or whether the personal device is capable of interfacing with the peripheral device such as by having an application that is used to interact with the peripheral device. The peripheral device can evaluate and compare these criteria from multiple different personal devices that respond to the pairing message and select one of the personal devices to establish a dedicated wireless connection with.

For example, a user's personal device may detect a gesture that is associated with using the peripheral device. The gesture can include movement of the peripheral device in a defined pattern, such as raising the peripheral device to look at a display, or other defined movement or sequence of movements. The personal device may send an indication of whether a gesture was detected in the response to the pairing message. In some cases, the personal device may initiate software that is associated with the peripheral device, such as an application that can be used to visualize data received from the peripheral device and/or control one or more functions of the peripheral device; this initiation may trigger a pairing between the personal device and the peripheral device. The personal device may also send an indication of whether it is operating software or has software that is associated with the scale in the response to the pairing message. Further, the peripheral device and/or the personal device may determine wireless signal strength between the scale and each personal device.

The peripheral device can receive responses to the pairing message from each personal device within wireless range, along with (or in addition to) associated signal strength data, and use this information to determine which personal device is associated with a user of the peripheral device. For example, the peripheral device may look for a personal device that fulfills a criterion or multiple criteria, examples of which are having or operating software associated with the peripheral device, detecting a gesture that is associated with use of the scale, and having high signal strength. If one device meets an appropriate set of criteria, then the peripheral device may determine that this device is associated with the user of the peripheral device and establish a secure connection with that personal device. Accordingly, the peripheral and the personal device can establish a dedicated wireless connection without requiring a user to manually confirm that they are associated with a specific personal device. For example, the dedicated wireless connection can be automatically established with the user's personal device based on contextual information, such as wireless signal strength indicating the personal device's proximity to the scale, gesture recognition, and/or capability of the personal device to interact with the scale, and so on. In this regard, a user may not be required to explicitly confirm that they are associated with a particular personal device such as by entering a code. Instead, a user may be able to walk up to a peripheral device and begin interacting with the peripheral device using his or her personal device without needing to do anything besides raising his or her personal device to look at it.

Once paired, the peripheral device can provide a real-time data stream associated with a detected parameter that can be displayed on the user's personal device. The real-time data stream can include transmitting data from peripheral devices to the personal device as soon as the data is measured or detected by the peripheral device. In some cases, this may include a slight delay between the peripheral device detecting, measuring or otherwise receiving the data and transmitting the data to the personal device. In some embodiments, the real-time data stream may be continuous, such that the data is sent to the personal device as it is being actively detected, measured or received by the peripheral device. In this regard, the personal device may receive data that is actively changing, for example in response to the changes detected by the peripheral device. In some cases, the user can view the real-time measurement data and/or control one or more functions of the peripheral device using his or her personal device.

The personal device can log the data, as well as modify, process, and/or display the data to the user in a variety of ways. For example, the personal device may display a measured parameter of the user in real time. For example, the user may see his or her measured parameter on a display of his or her personal device and see it change in response to changes in this parameter measured by the peripheral device. In some cases, the user can control one or more functions of the peripheral device through his or her personal device. For example, the user may initiate a measurement, reset the peripheral device, or select one or modify one or more functions of the peripheral device using their personal device. The user can save his or her data to his or her personal device, save his or her data at the peripheral device and/or save his or her data at a remote location such as a cloud based storage, which may allow his or her data to be tracked over time. In some examples, the user may set one or more personal preferences for the peripheral device. For example, the user can set sounds that provide different indications associated with the measurements such as a first sound indicating that the scale is resetting or taring its sensors, a second sound indicating that the peripheral device is ready for use, and a third sound indicating that the peripheral device has completed a measurement. (These sounds are but one example of suitable indications that may be used or emitted by a peripheral device, and the preferences/settings listed are examples of a wider universe of settings that may be linked to an indication.) The peripheral device and/or the personal device may store these personal settings, and apply them each time the user's device pairs with the peripheral device. In some cases, multiple sets of personal settings may be associated with different users and applied or activated when each specific user's personal device connects to the peripheral device.

In some cases, a paired personal device and a peripheral device may automatically disconnect or end the pairing session. For example, upon completion of a defined set of interactions, such as taking a weight measurement, the personal device may automatically disconnect from the peripheral device. Such functionality can allow the peripheral device to be ready for a next user and free the personal device such that it can connect to other peripheral devices. Accordingly, a user may be able to automatically and seamlessly connect and interact with multiple different peripheral devices over secure wireless connections without needing to manually interact with control functions of the personal device and/or the peripheral device to explicitly confirm each connection and/or disconnection event.

In some embodiments, a secure wireless connection may be established between the personal device and the peripheral device using one or more user specific metrics that are independently detected by the personal device and the peripheral device. For example, each of the personal device and the peripheral device may measure a physiological parameter of a user, such as a heart rate. The measured physiological parameter, such as the heart rate, may be used to generate a cryptographic factor at each of the personal device and the peripheral device. This physiological-based cryptographic factor can then be used to verify the wireless connection between the personal device and the peripheral device, which can increase the security of the wireless connection and reduce possible malicious events such as man-in-the-middle attacks.

The techniques, systems and concepts described herein may apply to a variety of different peripheral and personal devices. For example, personal devices can include devices such as smart watches, smart glasses, wearable health monitors, or other wearable devices, tablets, smart phones, or other personal device that is associated with an individual user. Examples of peripheral devices can include health monitoring devices such as scales, temperature measurements devices, heart rate monitors, blood pressure measurement devices, and so on; interactive devices such as virtual assistants, smart speakers, smart TVs; or any other peripheral device that is capable of establishing a dedicated wireless connection with personal device.

These and other embodiments are discussed below with reference to FIGS. 1-5. However, those skilled in the art will readily appreciate that the detailed description given herein with respect to these Figures is for explanatory purposes only and should not be construed as limiting.

FIG. 1 shows an example system 100 that automatically pairs a personal device 102 of a user 101 with a peripheral device 104 that a user 101 is interacting with. The personal device 102 is depicted as an electronic watch (e.g., a smartwatch), though this is one example embodiment of a personal device 102 and the concepts discussed herein may apply equally or by analogy to other personal devices 102, including other wearable devices such as glasses (e.g., smart glasses), jewelry, mobile phones (e.g., smartphones), tablet computers, head-mounted displays, digital media players (e.g., mp3 players, video players, and the like), health-monitoring devices, or the like. The peripheral device 104 is depicted as an electronic scale (here, a smart scale), though this is one example embodiment of a peripheral device 104 and the concepts described herein may apply equally or by analogy to other peripheral devices 104, including: temperature measurement device, heart rate monitors, blood pressure detectors, or other devices that are used to measure a physiological parameter of a user; home appliances such as thermostats, entertainment systems, lighting systems, cooking equipment; and/or other electronic sensors, virtual assistants, TVs, and so on.

The personal device 102 may be worn or carried by a user 101, or otherwise associated with the user 101, and optionally include one or more sensors that determine or estimate a condition of the user 101 (e.g., body temperature, heart rate, position, direction of movement or the like) and/or an environmental condition (e.g., air temperature, barometric pressure, moisture level, and so on), which may be displayed or presented to the user 101. Different sensors may be positioned at different locations on or within the personal device 102 depending on operating requirements of a particular sensor, the condition being detected by the sensor, the design of the personal device 102, and so on. In some cases, it may be desirable for the personal device 102 to track activity of a user (e.g., steps taken or distance covered), locate a user's position, generate a heat map of places the user has visited, and so on, which may all produce results that are displayed to the user on the display of the device. Some of these measurements may be time-sensitive and/or subject the device to a variety of conditions (e.g., water, changes in altitude, changes in temperature, etc.).

In embodiments where the personal device is a watch or other wearable, the personal device 102 can include a housing and a band coupled to the housing. The band may be configured to couple the personal device 102 to the user 101, such as to the user's arm or wrist. The personal device 102 can also include a transparent cover (which may be referred to simply as a "cover") coupled with the housing and positioned over a display. The cover may also define an input surface of the personal device 102. For example, as described herein, the personal device 102 may include touch and/or force sensors that detect inputs applied to the cover. The display may be positioned under the cover and at least partially within the housing. The display may define an output region in which graphical outputs are displayed. Graphical outputs may include graphical user interfaces, user interface elements (e.g., buttons, sliders, etc.), text, lists, photographs, videos, or the like. The display may include a liquid-crystal display (LCD), an organic light emitting diode display (OLED), or any other suitable components or display technology. In some cases, the display may output a graphical user interface with one or more graphical objects that display information collected from or derived from the pressure-sensing system. For example, the display may output a current barometric pressure associated with the electronic device or estimated altitude of the electronic device.

The peripheral device 104 can be an electronic device that is accessible by multiple different users and include one or more sensors that determine or estimate a condition of the user 101 (e.g., body temperature, heart rate, position, direction of movement or the like) and/or an environmental condition (e.g., air temperature, barometric pressure, moisture level, and so on), which may be displayed or presented to the user 101. Different sensors may be positioned at different locations on or within the peripheral device 104 depending on operating requirements of a particular sensor, the condition being detected by the sensor, the design of the peripheral device 104, and so on. In some cases, it may be desirable for the peripheral device 104 to track activity of a user (e.g., a physical parameter such a weight, heart rate, blood pressure, etc.) over multiple days, locate a user's position, and so on, which may all produce results that are displayed to the user on the display of the personal device 102. Some of these measurements may be time-sensitive (e.g., real-time sensor information).

The personal device 102 and the peripheral device 104 can automatically establish a dedicated wireless connection, and, once connected, the user 101 can use the personal device 102 to interact with the peripheral device 104. In some embodiments, a secure connection may be initiated by the peripheral device 104. This can include the user 101 activating the peripheral device 104, such as by pressing a button, interacting with a touch screen, stepping on the peripheral device 104, and so on. In response to the user input, the peripheral device 104 can transmit a pairing message indicating that a user has interacted with the peripheral device 104. This pairing message can be received by the personal device 102 and cause the personal device 102 to connect with the peripheral device 104. In some cases, the personal device 102 can activate software, such as an application that is used to interface with the personal device 102. Additionally or alternatively, the personal device 102 can monitor for one or more user inputs that indicate the user 101 is interacting with or intends to interact with the peripheral device 104. For example, the user 101 may activate an application on his or her smartwatch that is associated with the scale, step on the scale, and/or make a gesture such as by raising his or her arm to look at his or her smartwatch. In response, the scale can send a signal indicating that a user has interacted with the scale, which can be detected by the smartwatch. The smartwatch may also recognize and detect that the user made a specific gesture, such as raising his or her arm and/or activated a scale application on his or her watch.

The personal device 102 can attempt to establish a dedicated wireless connection with the peripheral device 104 by sending a pairing request to the peripheral device 104, which may include an indication of the detected user input such as a gesture made by the user and/or application capability. Additionally or alternatively, the personal device 102 and/or the peripheral device 104 can determine or estimate proximity between these devices, such as by evaluating signal strength. The peripheral device 104 can evaluate one or more of these parameters to determine whether to connect with the personal device 102. In some cases, for example, if the personal device 102 is the only device detected by the peripheral device 104, the peripheral device 104 can establish a connection with the personal device 102 based on the detected gesture and/or activation of the application associated with the peripheral device 104. Accordingly, the peripheral device 104 may not simply just connect with the personal device 102 because they are within wireless range. Instead, the peripheral device 104 can be configured to monitor for a user input, such as a gesture or activation of an application that indicates the user's desire to connect to the peripheral device 104. In other examples, the personal device 102 and/or the peripheral device 104 may be configured to detect one or more user inputs that indicate the user 101 desires to interact with the peripheral device 104 which can include different types of gestures, voice commands, prior pairing of the personal device 102 with the peripheral device 104, and so on. In this regard, the personal device 102 and the peripheral device 104 may be within each other's wireless signal range, but may not establish a connection until one or more other conditions occur, such as a defined action being taken by the user (e.g. gesture, activation of an application, voice command, etc.).

In some embodiments, voice commands may be used to establish a secure dedicated connection between the personal device 102 and the peripheral device 104. For example, the user may say a voice command that is recognized by both the personal device 102 and the peripheral device 104. The voice command can be used to initiate a pairing process between a specific personal device 102 and the peripheral device 104. For example, one or more personal devices 102 and the peripheral device 104 that are within range of each other may communicate with each other before any dedicated connection is established. Characteristics of the user's voice may be analyzed to identify the user in much the same way that a fingerprint, retina scan, facial scan, or other biometric may be used to identify the user. In this regard, the voice command may be used as an acoustic fingerprint that uniquely identifies one of the personal devices 102 for establishing a connection with the peripheral device 104. Thereafter, a dedicated session can be secured using additional verification factors, such as cryptographic pairing techniques, as described herein. For example, in response to recognizing the voice command, the peripheral device 104 can send a cryptographic signature, and the personal device 102 can receive the signature and use it to verify the authenticity of the peripheral device 104. The personal device 102 and/or the peripheral device can be configured to recognize one or more voice commands, which may be associated with different functions of these devices. For example, a voice command to set up a device may be used during the initial pairing process to establish the dedicated connection. In other cases, a voice command to take a measurement can be used to initiate a measurement at the peripheral device 104 and transfer this measurement data to the personal device. In this regard, using voice commands to initiate a dedicated connection can provide a multichannel verification process that facilitates seamlessly identifying a specific personal device 102 for pairing with the peripheral device 104.

In some cases, once connected, the peripheral device 104 can transmit a continuous stream of data to the personal device 102, which can include one or more parameters that are detected by sensors of the peripheral device 104. For example, if the peripheral device 104 is a scale, the peripheral device 104 can transmit measured weight data to the personal device 102. The continuous stream of data can include real-time values of a weight being measured by the scale. Accordingly, the personal device 102 can display this dynamic data to the user 101 such that the user can see his or her weight change as the scale settles to a final value.

In some cases, the user 101 may interact with his or her personal device 102 to control one or more functions associated with the peripheral device 104. For example, the user 101 could use his or her personal device 102 to reset the peripheral device 104 before using it, such as taring the scale before stepping on. In other examples, the user 101 can use his or her personal device 102 to set one or more preferences and/or modify functions for the peripheral device 104, such as by making selections on an interface of his or her personal device 102 to control functions of the peripheral device 104. For example, the user 101 could set preferences or modify functions related to sounds, lighting, measurement units, device functions, and so on. In further examples, the personal device 102 can associate data received from the peripheral device 104 with the user 101 and/or store that data locally or remotely. For example, the personal device 102 can store a weight of the user 101 from each time the user 101 steps on the scale, which can allow the user 101 to track his or her weight over time and process and/or visualize how his or her weight changes over a period of time. In further examples, the personal device 102 can receive and store data from multiple different peripheral devices, which may allow a user 101 to use his or her personal device 102 to access and/or correlate measurements taken by multiple different peripheral devices. For example, the personal device 102 could store weight measurements from the scale, heart rate measurements from a heart rate monitor, blood pressure measurements from a blood pressure device, and so on. The personal device 102 can correlate these different measurements in a variety of ways, such as by correlating the user's weight with the user's heart rate and blood pressure. In this regard, the personal device 102 can provide a single interface in which the user 101 can access, visualize, and track a variety of data taken by different peripheral devices 104.

Figure 2:
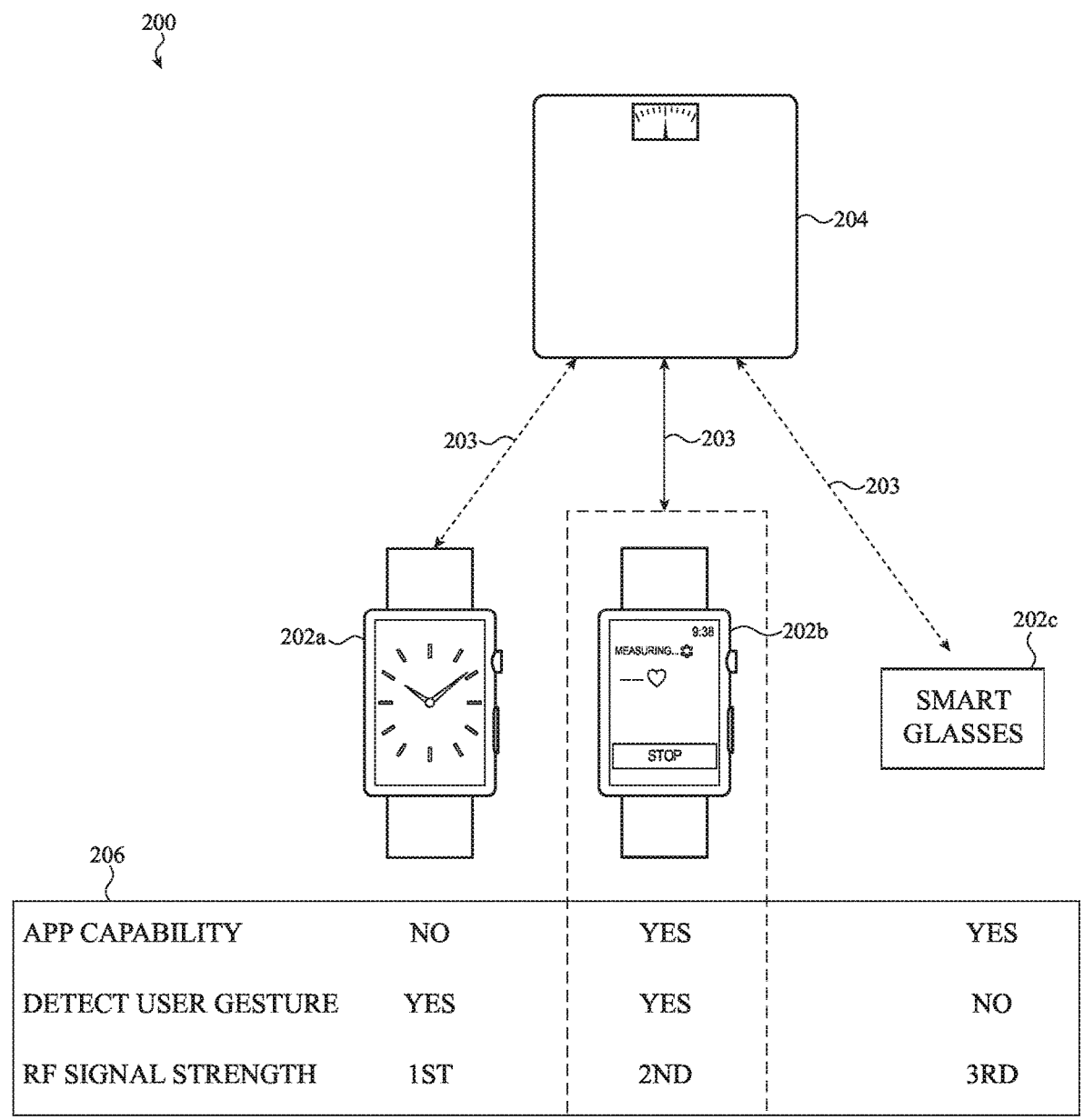
FIG. 2 shows an example system for automatically pairing a wearable device with a peripheral device.

FIG. 2 shows an example process 200 for pairing a personal device 202 with a peripheral device 204. The pairing process 200 can include a single peripheral device 204 selecting and establishing a dedicated wireless connection 203 with a single personal device 202 by selecting it from multiple personal devices 202. In some cases, the peripheral device 204 can evaluate various criteria to determine which personal device 202 to establish a dedicated connection with. For example, the criteria can include things such as a proximity of each personal device 202 to the peripheral device 204, whether a personal device 202 has detected a user input that indicates the user is interacting with or intends to interact with the peripheral device 204 such as a specific gesture, whether the personal device 202 has a capability to interact with the peripheral device 204 such as through an application, or other criteria that are used to differentiate a personal device 202 of a user that is interacting with the peripheral device from other personal devices 202. The peripheral device 204 can determine or receive a state for each criterion 206 for each personal device 202 and compare the states to determine which personal device 202 is associated with a user that is currently interacting with the peripheral device 204. The peripheral device 204 can use this determination to connect to the personal device 202b of the user interacting with the peripheral device 204. Accordingly, the other personal devices 202a and 202c, which may be associated with other persons, do not receive the user's data.

In some embodiments, the process may be initiated by a user interacting with the peripheral device 204, for example, stepping on a scale. In response to the user interaction, the peripheral device 204 can transmit a pairing message indicating the user interaction and evaluate responses from each of the personal devices 202. The responses from each personal device 202 can include information about one or more criteria 206 associated with the respective personal device 202. For example, a first criterion may include whether a specific user input was detected by each personal device 202. The user input may be a gesture, voice input, touch input to the personal device, or any other suitable user input that is used to deduce whether a user is interacting with or intends to interact with the peripheral device 204. A second criterion can include determining whether the personal device 202 is capable of interacting with the peripheral device, for example, by having software that is associated with the peripheral device 204.

In this example, the first personal device 202a can send a response that indicates that the user made a gesture that is associated with use of the peripheral device (e.g., hand raise). However, the first personal device 202a may not have software that supports interactions with the peripheral device 204. Accordingly, the response from the first personal device 202 may not include any indication of software capability, which can be interpreted by the peripheral device 204 as the first personal device 202a lacking this capability. The second personal device 202b may have both detected the user gesture and have software that supports interaction with the peripheral device 204. Accordingly, the second peripheral device 202c may send a response that indicates this status of both of these criteria 206. The third personal device 202b may have software that supports interaction with the peripheral device 204, but may not have detected a user gesture that is associated with use of the peripheral device 204. Accordingly, the third peripheral device 202c may send a response that indicates the status of these criteria 206.

Additionally or alternatively, another criterion may include estimating proximity between the peripheral device 204 and/or each personal device 202. In some cases, signal strength between each personal device 202 and the peripheral device 204 can be determined and used to estimate each personal device's proximity to the peripheral device 204. For example, the first personal device 202a may be closest to the peripheral device 204 and be determined to have the greatest signal 203a strength. The second personal device 202b may be the second closest to the peripheral device 204 and be determined to have the second greatest signal 203b strength. The third personal device 202c may be the third closest to the peripheral device 204 and be determined to have the third greatest signal 203c strength. In some embodiments, the distance between each personal device 202 and the peripheral device 204 can be calculated using triangulation from multiple devices. For example, signal and position data from multiple personal devices 202 and/or the peripheral device can be used to determine a location for one or more of the personal device 202 relative to each other and the peripheral device 204.

In some cases, distance and/or position sensing can be used to select a personal device 202 for establishing a dedicated connection with the peripheral device 204. For example, an orientation or change in orientation of one or more personal devices 202 can be used as a selection criteria. In some cases, if a personal device 202 has an orientation that indicates it is being tilted to allow a user to view a display and/or that personal device 202 is also in close proximity to the peripheral devices 204, these factors can be used to select that personal device 202 for pairing. A change in the orientation of the personal device 202 with respect to the peripheral device 204 can also be used. For example, distance or position sensing can be used to track movement of the personal device 202 and/or the peripheral device 204, and changes in distance and/or position can be used to recognize gestures, whether a user is moving toward or away from the peripheral device 204, a proximity of various personal devices 202 with respect to the peripheral device 204, and so on. As one example, a user approaching a peripheral device 204 can be determined by tracking changes in distance of the personal device 204 with respect to the peripheral device 204. In some cases, the system can be configured to select a personal device 202 that indicates a user approaching the peripheral device 204 over other personal devices 202 that are moving in other directions, such as away from the peripheral device 204. Accordingly, the system can use position and distance data to track movement and/or orientations of the personal devises 202, and use this data to select a specific personal device 202 for pairing.

Various types of technologies and/or combinations of technologies can be used to determine distance and position of the personal devices 202 relative to the peripheral device 204. For example, ultra-wideband signals can be used to determine distance, and/or other position data between the peripheral device 204 and one or more of the personal devices 202. Ultra-wide band signals can provide information about the relative position and/or orientation of the personal devices 202, which can be used to select which personal device 202 is selected for a dedicated wireless connection with the peripheral device 204. For example, the peripheral device 204 and/or the personal devices 202 can include multiple radios positioned at different locations in these devices. Ultra-wideband signals can be used to determine distance between different ones of these radios, which can be used to determine relative orientations and/or changes in the orientations of the personal devices 202 with respect to the peripheral device 204. In some cases, the orientation and/or change in orientation of a personal device 202, such as titling a device to view a display, can be used to select a personal device 202. Additionally or alternatively, other technologies such as Bluetooth, global positioning system (GPS) data, Wi-Fi signals, and/or the like can be used to select a personal device 202 to establish a dedicated wireless connection with the peripheral device 204. In other cases, the personal devices 202 and peripheral devise 204 can include optical sensors, touch sensors, light sensors, and/or the like which can be used to perform distance and position sensing. For example, an optical sensor can be used to detect a user approaching and/or interacting with a peripheral devices 204.

The peripheral device 204 may compare these criteria 206 from each personal device 202 and use the comparison to determine which personal device 202 to establish a dedicated wireless connection with. In some cases, the peripheral device 204 may only connect with a personal device 202 that is within wireless connection range, has an application that is capable of interacting with the peripheral device 204, and has detected a user gesture that indicates the user is interacting with the peripheral device 204. If multiple personal devices 204 meet both of these criteria, then the peripheral device 204 may use the signal strength to determine with which personal device 202 to connect. For example, the peripheral device 204 may select the personal device 202 that meets all the criteria and has the greatest signal strength, as it is likely that the user of the peripheral device 204 is the closest person to the peripheral device 204. In the illustrated example, the second personal device 202b is the only device that has both the application capability to interact with the peripheral device 204 and has detected a user gesture (e.g., hand raise) that is associated with use of the peripheral device 204. Accordingly, in this example, the personal device 204 will establish a wireless connection with the second personal device 202b.

In some embodiments, the peripheral device 204 can evaluate other or additional criteria to determine which personal device 202 to connect with when multiple personal devices 202 are present. For example, the peripheral device 204 can determine whether personal devices 202 have connected with the peripheral device 204 before and may prioritize connecting to these known personal devices 202 over unknown personal devices 202 (e.g., those that have not connected with the peripheral device 204 before). In some cases, the peripheral device 204 and the personal device 202 may establish a priority for multiple different personal devices 202. This can be a user defined priority or based on other factors. For example, the personal device 202 that has connected with the peripheral device 204 the most time may be given the highest priority. In other cases, the personal device 202 that more recently connected with the peripheral device 204 may be given a higher priority.

In some cases, data detected by the peripheral device 204 and/or one or more of the personal devices 202 can be used to determine which personal device 202 is associated with the user that is interacting with the peripheral device 204. For example, when a user initially interacts with the peripheral device 204, the peripheral device 204 may begin to measure a parameter associated with the user prior to connecting to the personal device 202. The peripheral device 204 can use this measured parameter to determine which personal device to connect with. For example, if the peripheral device 204 is a scale, then when a user steps on, the scale may begin to measure a weight of the user. In some examples, the scale can correlate the currently measured weight with weights that are associated with each of the personal devices 202. In this regard, the peripheral device 204 may be able to identify one of the personal devices 204 as being associated with the measured weight. In other cases, for example if multiple different users have similar weights, the peripheral device 204 may be able to eliminate some personal devices 202 to narrow down the pool of potential personal devices 202.

In further examples, both the personal device 202 and the peripheral device 204 may be operative to independently measure the same parameter of a user. The peripheral device 204 can compare the value it measured for the parameter to different personal devices 202 to determine which personal device 202 is associated with the user of the peripheral device 204. For example, both the peripheral device 204 and the personal device 202 may be operative to measure a heart rate. The peripheral device 204 may compare the heart rate it measured with the heart rates measured by each personal device 202 and use this comparison to determine which personal device 202 is associated with the user of the peripheral device 204.

In some embodiments, the peripheral device 204 may narrow the pool or potential personal devices 202 down, but may not be able to determine which personal device 202 is associated with the user between multiple different personal devices 202. In these cases, the peripheral device 204 may send a notification to the pool of potential personal device 202 that prompts the user of the peripheral device 204 to identify his or her personal device 202, for example, by entering a code, tapping a confirmation button on his or her personal device 202, or performing some other function to identify his or her personal device 202.

Figure 3:
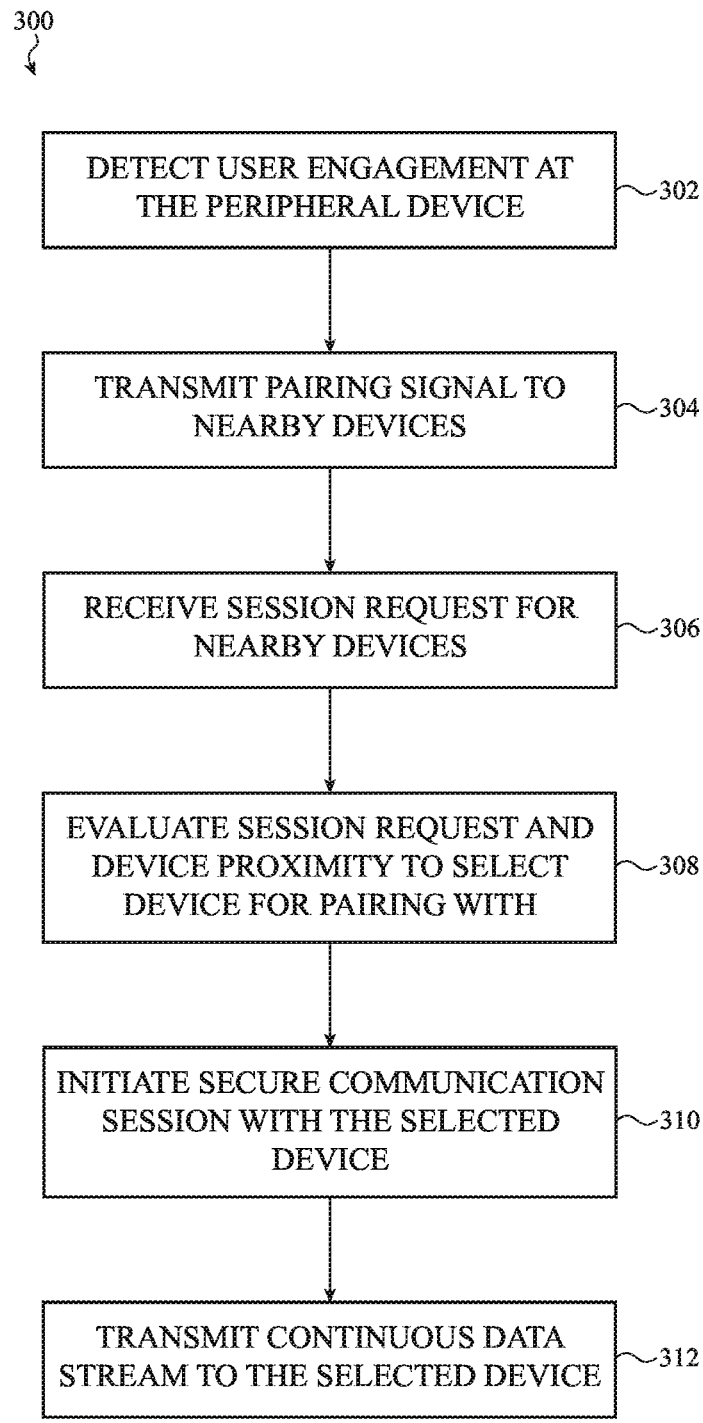
FIG. 3 shows an example method for a peripheral device to automatically select and pair with a nearby wearable device.

FIG. 3 shows an example method 300 for a peripheral device automatically selecting and pairing with a nearby wearable device. The method 300 may be performed by any of the devices described herein. This is one example of a dedicated connection sequence and other sequence steps or connection modes are possible.

At 302, the method 300 can include detecting a user engagement with a peripheral device. In some cases, this can include a user waking the peripheral device from a sleep mode, such as by interacting with one or more input mechanisms of the peripheral device. In other examples, this can include a user beginning to use the device, which may include stepping on a scale, positioning a medical sensor on the user's body, or any other user interaction with a device in which the user is preparing to or starts using the device. In some cases, detecting a user engagement could include detecting that a personal device of the user has entered into a wireless connection range of the peripheral device. In further examples, detecting the user engagement could include tracking use over a period of time and using the tracked data to determine or estimate when the peripheral device will be used next by the user. For example, if the user weighs themselves on a scale every day at the same time, detecting a user engagement may include the peripheral device activating at that same time the next day in anticipation of the user interacting with the device.

At 304, the method 300 can include the peripheral device transmitting a pairing message to nearby personal devices that indicates a user has interacted with the peripheral device and/or is seeking to pair with one of these nearby personal devices. In some cases, the pairing message can be in response to a connection request from one or more personal devices that are in range of the peripheral device. In other cases, the peripheral device can passively transmit a pairing message to nearby personal devices. For example, the peripheral device could send out a pairing message that is received by all the personal devices within range. This passive pairing message can be used to initiate a dedicated communication session with a personal device prior to a user of the personal device interacting with the peripheral device.

At 306, the method 300 can include the peripheral device receiving a dedicated session request from one or more nearby personal devices to initiate a secure connection with the personal device(s). In some cases, this can include using cryptographic signatures to secure the data transferred between the peripheral device and each personal device. As one example, each personal device sending a public key and/or metadata to the peripheral device. The metadata can include information about parameters of the personal device, such as whether the personal device has an application that is compatible with the peripheral device, whether the personal device detected a gesture as described herein, information about a detected physiological parameter of a user such as a weight or heart rate, and so on. The public key can be used to uniquely identify and/or verify the personal device.

In some cases, the gesture can include a defined sequence of movements that are detected by the personal device, such as by the user raising his or her hand when the personal device is a watch. If the personal device includes an application that is associated with the peripheral device, the application may be operative to associate the gesture with use of the peripheral device. For example, when the personal device is a watch, the application may be configured to determine that a wrist raise of the watch indicates that the user is interacting or intends to interact with the peripheral device.

In some embodiments, activation of an application associated with the peripheral device can be used in determining which personal device belongs to the user. For example, the user may activate the application prior to engaging with the peripheral device and/or making a gesture. In this regard, the application may be used to differentiate a gesture that is used in other contexts, such as checking time, from the same or similar gesture that is used to indicate that a user is interacting with the peripheral device. For example, when the application is not active, a user may raise his or her wrist and a time may be displayed on the watch. However, if the application associated with the peripheral device has been activated, the same raising wrist gesture may now indicate that the user is interacting with or intends to interact with the peripheral device.

At 308, the method 300 can include the peripheral device evaluating the session request from each of the personal devices. Additionally or alternatively, the peripheral device can evaluate proximity of each of the personal devices. This can include the peripheral device determining whether each of the personal devices has an application that is operative to interact with the peripheral device and/or determining whether the personal device has detected a gesture, voice command, or other action by the user that indicates that the user is interacting with the peripheral device. In some cases, the session request from one or more of the personal devices can include a physiological parameter of the user that is measured by the personal device. The peripheral device can compare the physiological parameter measured by the personal device with a physiological parameter that it measures, which may be used to select which personal device the peripheral device connects with.

At 310, the method 300 can include initiating a dedicated communication session with the personal device that it selected to connect with. In some cases, the peripheral device can measure one or more physical parameters of the user such as a heart rate, blood pressure, respiration, weight, and so on, and use these physical parameters to generate a cryptographic signature specific to the user. The peripheral device can send this cryptographic signature to the connected personal device and the personal device can use this user derived cryptographic signature to establish a secure connection. In some cases, the personal device can include one or more sensors that independently monitor a physiological parameter of a user and independently generate a cryptographic translation using the physiological parameter detected by the personal device. The cryptographic translation can be used to verify the cryptographic signature generated at the peripheral device. In some embodiments, the peripheral device and the personal device may continue to generate and validate the cryptographic signatures while the communication connection is active. In other embodiments, voice commands that are recognized by the personal device and/or the peripheral device can be used to initiate a secure connection as described herein.

At 312, the method 300 can include the peripheral device transmitting a real-time data stream to the personal device. The real-time data stream can include data that is detected by one or more sensors of the peripheral device. In some cases, the real-time data stream may be delayed with respect to the peripheral device receiving, detecting or measuring the data.

For example, the delay may be due to processing or signal transmission activities such as analog to digital conversion, preparing data packets, and so on. In other cases, the data stream can include intermittent transmissions, for example transmission that are sent at defined intervals or in response to changes in data. The personal device can output a visual indicator the displays information for the parameter measured by the peripheral device. For example, if the peripheral device is measuring a physical parameter, such as a weight, heart rate, blood pressure, or respiration, the personal device may display a real-time value associated with one or more of these physical parameters. In cases where the peripheral device is a control system for another electronic device, such as a thermostat, the personal device may output a current parameter, such as a temperature of the environment, and allow a user to adjust the set temperature by interacting with his or her personal device instead of the peripheral device.

Figure 4:
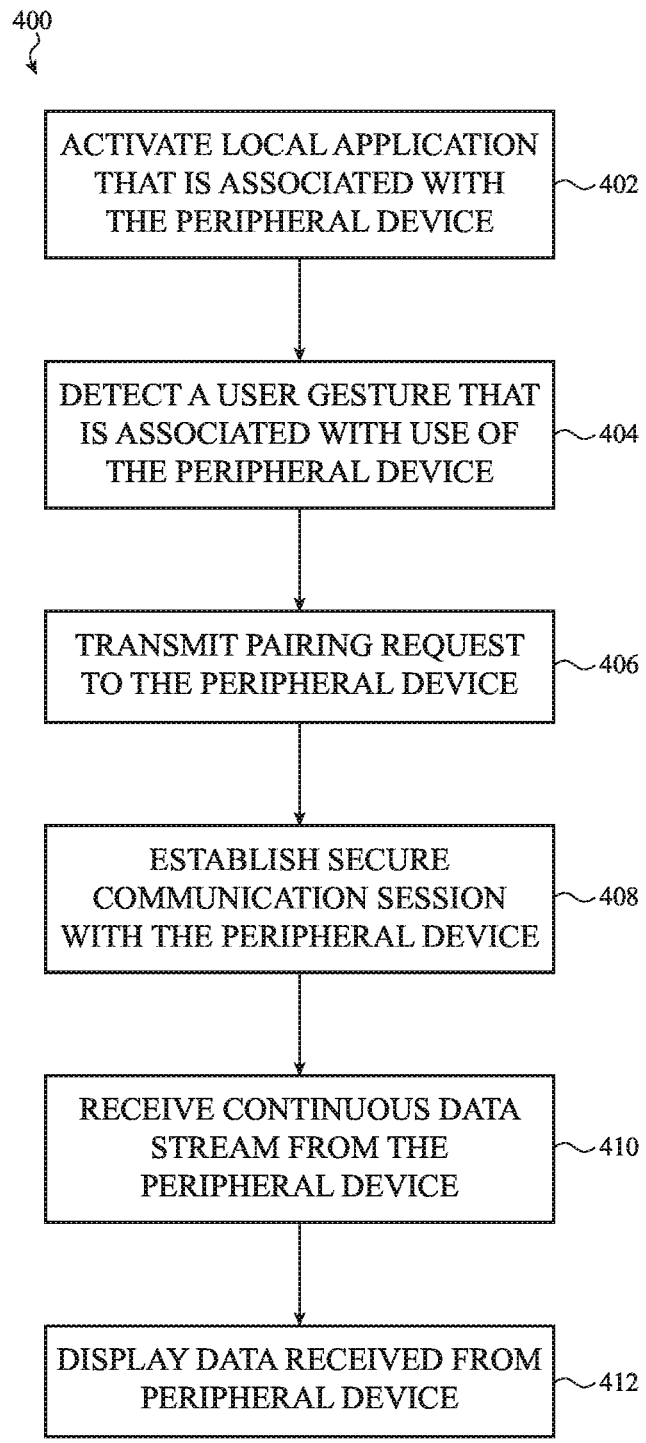
FIG. 4 shows an example method for a wearable device to initiate automatic pairing with a peripheral device.

FIG. 4 shows an example method 400 for a wearable device to initiate automatic pairing with a peripheral device. The method may be performed by any of the devices described herein.

At 402, the method 400 may include a personal device initiating a pairing sequence with a peripheral device by activating a local application on the peripheral device that is associated with the peripheral device. The local application may be used to interact or otherwise communicate with the peripheral device. In some cases, the local application can be capable of interfacing with multiple different personal devices. The application may be presented on a display of the personal device and present data, control functions, and other functions associated with the peripheral device to the user.

At 404, the method 400 can include the personal device detecting a user gesture that is associated with use of the peripheral device. In some cases, this may be a gesture that includes a defined movement or series of defined movements. In other cases, the gesture can include a voice command, input to an input mechanism, such as a touch screen, of the personal device. In some embodiments, the personal device may be operative to provide one or more types of feedback to a user, such as a haptic output, sound output, visual confirmation, or the like. The feedback can be used to indicate that a gesture was recognized.

At 406, the method 400 can include the personal device transmitting a pairing request to the peripheral device. The pairing request can include one or more parameters, for example, an application capability of the personal device, whether the user input is a recognized gesture, one or more measured physiological parameters of the user, or the like.

At 408, the method 400 can include establishing a secure communication session with the peripheral device. This can include using cryptographic signatures such as public-private key encryption techniques, which can utilize a cloud service to check or verify authenticity of the key pairs. In some cases, near field communication (NFC) protocols could be used. In further examples, codes could be utilized at the peripheral and personal devices to confirm pairing. For example, the peripheral device could display a code that is entered or confirmed at the personal device to reduce the risk of malicious attacks. Additionally or alternatively, bio-authentication processes could be used, such as generating physiological-based security keys as described herein.

At 410, the method 400 can include the personal device receiving a continuous data stream from the peripheral device, as described herein. At 412, the method 400 can include displaying data received from the peripheral device on the personal device. In some cases, the personal device can process or otherwise analyze the data to present different metrics to the users. For example, the personal device can determine averages over a period of time, such as a day, week, or year and display multiple different measurement periods to the user. In some cases, this can include the personal device accessing data that was stored in a remote storage such as cloud-based storage.

Figure 5:
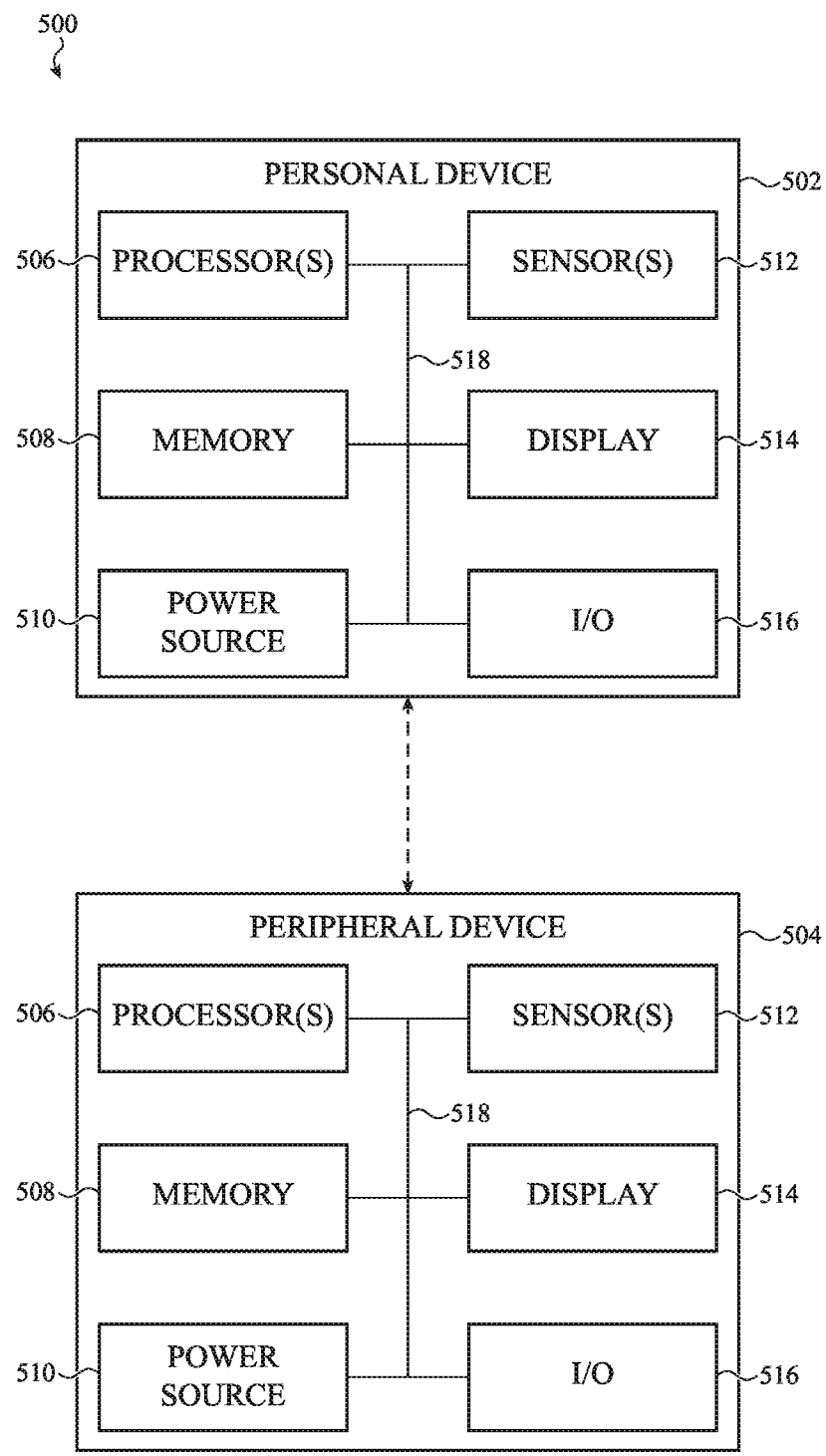
FIG. 5 is an example block diagram for a system that includes a wearable device that is used to interact with and display data from a peripheral device.

FIG. 5 is an example block diagram for a system 500 that includes a personal device 502 that is used to interact with and display data from a peripheral device 504. The system 500 may, in some cases, take the form of any of the devices or components thereof described with reference to FIGS. 1-4. Each of the personal device 502 and the peripheral device 504 (collectively referred to as the "electronic devices") can include a processor 506, memory 508, a power source 510, an input/output (I/O) mechanism (or device) 516, one or more sensors 512, and a display 514.

Processors 506 can control some or all of the operations of each of the electronic devices 502 and 504. The processors 506 can communicate, either directly or indirectly, with some or all of the components of the electronic devices 502 and 504. For example, system buses or other communication mechanisms 518 can provide communication between the processors 506, the memory 508, the power sources 510, input/output (I/O) mechanisms 516, the one or more sensors 512, the displays 514 and the output devices 516.

The processors 506 can be implemented as any electronic device capable of processing, receiving, or transmitting data or instructions. For example, the processors 506 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitable computing element or elements.

It should be noted that the components of each of the electronic devices 502 and 504 can be controlled by multiple processors. For example, select components of each of the electronic devices 502 and 504 (e.g., a sensor 512) may be controlled by a first processor and other components of the electronic devices 502 and 504 (e.g., the display 514) may be controlled by a second processor, where the first and second processors may or may not be in communication with each other.

The memory 508 can store electronic data that can be used by the electronic devices 502 and 504. For example, the memory 508 can store electrical data or content such as, for example, audio and video files, documents and applications, device settings and user preferences, timing signals, control signals, and data structures or databases. The memory 508 can be configured as any type of memory. By way of example only, the memory 508 can be implemented as random access memory, read-only memory, Flash memory, removable memory, other types of storage elements, or combinations of such devices.

The power sources 510 can be implemented with any device capable of providing energy to each of the electronic devices 502 and 504. For example, the power sources 510 may be one or more batteries or rechargeable batteries. Additionally or alternatively, the power sources 510 can be a power connector or power cord that connects each of the electronic devices 502 and 504 to another power source, such as a wall outlet.

The I/O mechanisms 516 can transmit and/or receive data from a user or another electronic device. An I/O mechanism 516 can include a display, a touch sensing input surface, one or more buttons (e.g., a graphical user interface "home" button), one or more cameras, one or more microphones or speakers, one or more ports, such as a microphone port, and/or a keyboard. Additionally or alternatively, an I/O device or port can transmit electronic signals via a communications network, such as a wireless and/or wired network connection. Examples of wireless and wired network connections include, but are not limited to, cellular, Wi-Fi, Bluetooth, IR, and Ethernet connections.

Each of the electronic devices 502 and 504 may also include one or more sensors 512 positioned almost anywhere on the electronic devices 502 and 504. The sensor(s) 512 can be configured to sense one or more types of parameters, such as but not limited to, pressure, sound, light, touch, heat, movement, relative motion, biometric data (e.g., biological parameters), and so on. For example, the sensor (s) 512 may include a pressure sensor, an auditory sensor, a heat sensor, a position sensor, a light or optical sensor, an accelerometer, a pressure transducer, a gyroscope, a magnetometer, a health monitoring sensor, and so on. Additionally, the one or more sensors 512 can utilize any suitable sensing technology, including, but not limited to, capacitive, ultrasonic, resistive, optical, ultrasound, piezoelectric, and thermal sensing technology.

Each of the electronic devices 502 and 504 may also include a display 514. The display 514 may include a liquid-crystal display (LCD), an organic light emitting diode (OLED) display, a light emitting diode (LED) display, or the like. If the display 514 is an LCD, the display 514 may also include a backlight component that can be controlled to provide variable levels of display brightness. If the display 514 is an OLED or LED type display, the brightness of the display 514 may be controlled by modifying the electrical signals that are provided to display elements. The display 514 may correspond to any of the displays shown or described herein.

As described above, one aspect of the present technology is determining physiological and/or other parameters of a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for using a personal device to interact with a peripheral device, the method comprising:
    receiving a pairing message, generated by the peripheral device, in response to a user interaction with the peripheral device;
    detecting, at the personal device, a user gesture that is associated with use of the peripheral device;
    in response to receiving the pairing message and detecting the user gesture, establishing a dedicated wireless connection with the peripheral device;
    receiving a real-time data stream over the dedicated wireless connection, the real-time data stream comprising data related to one or more physical parameters for the user that are detected by the peripheral device; and
    outputting, to a user, information at least partially based on data received from the peripheral device via the real-time data stream.

2. The method of claim 1, wherein the user gesture comprises a defined sequence of movements that is detected by the personal device.

3. The method of claim 2, further comprising activating an application at the personal device that is associated with the peripheral device, wherein the application is activated prior to the personal device detecting the defined sequence of movements.

4. The method of claim 1, further comprising:
    receiving a notification from the peripheral device that requests a confirmation as to whether the user is currently interacting with the peripheral device; and
    in response to receiving the notification, transmitting the confirmation to the peripheral device.

5. The method of claim 1, wherein outputting the information comprises displaying the one or more physical parameters of the user on a display of the personal device.

6. The method of claim 5, wherein the displayed one or more physical parameters comprise real-time measurements that are being detected by the peripheral device.

7. The method of claim 1, further comprising:
    receiving an input at the personal device in response to outputting the information to the user; and
    transmitting a command to the peripheral device in response to receiving the input, the command modifying a current function being executed by the peripheral device.

8. The method of claim 1, wherein:
    initiating the dedicated wireless connection to the peripheral device comprises transmitting a public key and metadata to the peripheral device;
    monitoring, using the personal device, a physical parameter of the user;
    generating a cryptographic translation at the personal device using the physical parameter;
    receiving a cryptographic signature from the peripheral device by monitoring the physical parameter of the user at the peripheral device; and
    validating the cryptographic signature using the cryptographic translation.

9. The method of claim 8, wherein:
    the personal device receives multiple cryptographic signatures from the peripheral device while connected to the peripheral device; and
    the personal device validates the cryptographic signatures using cryptographic translations generated from monitoring the physical parameter.

10. A method for operating a peripheral device, comprising:
    sending a pairing message, from the peripheral device, in response to a user interaction with the peripheral device;
    receiving a connection request from a personal device that includes an indication of a user input that is associated with use of the peripheral device;
    evaluating one or more criteria associated with one or more personal devices within a wireless range of the peripheral device;
    in response to evaluating the one or more criteria and the user input, establishing a dedicated wireless connection with a first personal device of the one or more personal devices;
    receiving a command from the first personal device related to the user interaction with the peripheral device; and
    in response to receiving the command, transmitting a data stream over the dedicated wireless connection to the personal device, the data stream comprising data related to one or more physical parameters for the user that are detected by the peripheral device.

11. The method of claim 10, wherein evaluating the one or more criteria comprises comparing signal strengths of the one or more personal devices.

12. The method of claim 11, wherein establishing the dedicated wireless connection with the first personal device is at least partially based on determining that a signal strength of the first personal device exceeds signal strengths of other devices of the one or more personal devices.

13. The method of claim 10, wherein the user input comprises a defined sequence of movements that indicate that a user is interacting with the peripheral device.

14. The method of claim 10, wherein establishing the dedicated wireless connection comprises establishing a secure connection with the personal device using data from a user interacting with the peripheral device.

15. The method of claim 14, wherein:
    the data comprises one or more physiological parameters of the user; and
    the peripheral device establishes the secure connection using the one or more physiological parameters.

16. The method of claim 10, wherein evaluating the one or more criteria comprises determining whether the one or more personal devices have software that is associated with the peripheral device.

17. A method for operating a peripheral device, the method comprising:
    transmitting a pairing message from the peripheral device in response to a user interaction with the peripheral device;

receiving a connection request from first and second personal devices;

determining a signal strength for each of the first and second personal devices;

determining a software capability of each of the first and second personal devices;

receiving a signal of a detected user input occurring at one of the at least first or second personal devices;

in response to receiving the connection request from the first and second personal devices, establishing a dedicated wireless connection with one of the first or second personal devices at least partially based on comparing the signal strength, the software capability, and the signal of the detected user input; and transmitting a data stream over the dedicated wireless connection, the data stream comprising data related to one or more physical parameters for the user that are detected by the peripheral device.

18. The method of claim 17, wherein:

the signal was received from the first personal device and indicates that the detected user input occurred at the first personal device; and the dedicated wireless connection is established with the first personal device at least partially based on receiving the signal from the first personal device.

19. The method of claim 17, wherein:

the peripheral device is operative to monitor one or more physical parameters of a user; and the data stream includes real-time measurement data of the one or more physical parameters of the user.

20. The method of claim 17, further comprising:

receiving a command from the one of the first or second personal devices that has established the dedicated wireless connection with the peripheral device; and modifying a current function being executed by the peripheral device at least partially based on the command.

* * * * *